US011163780B2

(12) United States Patent
Erera et al.

(10) Patent No.: US 11,163,780 B2
(45) Date of Patent: Nov. 2, 2021

(54) UTILIZING PASSAGES IN FUSION-BASED DOCUMENT RETRIEVAL

(71) Applicant: International Business Machines Corporation, Armonk, NY (US)

(72) Inventors: Shai Erera, Gilon (IL); Guy Feigenblat, Givataym (IL); Yosi Mass, Ramat Gan (IL); Haggai Roitman, Yoknea'm Elit (IL); Bar Weiner, Kibbutz Yad Mordechai (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/669,563

(22) Filed: Oct. 31, 2019

(65) Prior Publication Data

US 2021/0133199 A1    May 6, 2021

(51) Int. Cl.
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC ................................................. G06F 16/24578
See application file for complete search history.

(56) References Cited

U.S. PATENT DOCUMENTS

| 2006/0059138 A1* | 3/2006 | Milic-Frayling ... G06F 16/9535 |
| 2016/0132505 A1* | 5/2016 | Palmer .............. G06F 16/24578 |
|  |  | 707/706 |
| 2017/0060856 A1 | 3/2017 | Turtle et al. |

OTHER PUBLICATIONS

A Probabilistic Fusion Framework written by Yael Anava, CIKM'16, Oct. 24-28, 2016, Indianapolis, IN, USA, 2016 ACM. ISBN 978-1-4503-4073—Jan. 16, 2010. (Year: 2016).*
Utilizing Passages in Fusion-based Document Retrieval written by Haggai Roitman, ICTIR '19, Oct. 2-5, 2019, Santa Clara, CA, USA, https://dl.acm.org/doi/10.1145/3341981.3344212 (Year: 2019).*
Eilon Sheetrit et al., "Learning to Rank Documents by Learning to Rank Passages", Apr. 16, 2018.
Anna Khudyak Kozorovitsky et al., "From "Identical" to "Similar": Fusing Retrieved Lists Based on Inter-Document Similarities", Journal of Artificial Intelligence Research 41, 2011, pp. 267-296.

(Continued)

*Primary Examiner* — Hau H Hoang
(74) *Attorney, Agent, or Firm* — Gregory J. Kirsch (57) ABSTRACT

Embodiments of the present systems and methods may provide techniques that provide improved information retrieval. For example, a method may comprise receiving, at the computer system, a query to retrieve a document from a corpus of documents, retrieving, at the computer system, a plurality of documents from the corpus of documents using a plurality of retrieval methods, each retrieval method generating a ranked list of retrieved documents and a score for each document, fusing, at the computer system, the generated ranked list of retrieved documents to form an aggregated ranked list of retrieved documents by re-scoring, at the computer system, the plurality of documents according to its passage scores, with respect to the query and associating, at the computer system, a given document and its maximal passage using relevance information induced from the plurality of ranked lists.

15 Claims, 3 Drawing Sheets

(56) References Cited

OTHER PUBLICATIONS

Nouha Othman et al., "A relevant passage retrieval and re-ranking approach for open-domain Question Answering", ResearchGate, Jan. 2016.
Lyndon Kennedy et al., "Query-Adaptive Fusion for Multimodal Search", Proceedings of the IEEE, Apr. 2008, vol. 96, Issue: 4.
Michael Bendersky et al., "Utilizing Passage-Based Language Models for Document Retrieval", ECIR'08 Proceedings of the IR research, 30th European conference on Advances in information retrieval, 2008, pp. 162-174.

* cited by examiner

UTILIZING PASSAGES IN FUSION-BASED DOCUMENT RETRIEVAL

BACKGROUND

The present invention relates to techniques that provide improved information retrieval using a fusion-based retrieval approach that utilizes passage-level information for enhanced retrieval quality.

Fusion-based information retrieval may involve combining multiple sources of information so as to produce a single set of results in response to a query. For example, the results from multiple ranking processes, different document representations, and/or different representations of the information requested may be combined or fused to produce a single result set. For example, in a fusion setting, several retrieval methods may be evaluated over the same corpus of documents, with each retrieving a ranked-list of top-k documents. A fusion method may then normalize the scores of the retrieved documents (making them more comparable) and may then apply some aggregation approach to obtain a final (fused) ranked-list. There are many conventional fusion approaches. Typically, such conventional methods only utilize properties of either the documents in the pool of documents or the ranked-lists as a whole.

Passage-based document retrieval methods utilize passages or selections within each document to enhance the document's relevance estimation. Passages are usually considered at the granularity of a few sentences or defined by a text window. More recently, neural IR approaches have been proposed and utilize a more flexible passage selection and scoring approach. A key disadvantage of passage-based document models is that they only consider passages that belong to the document itself and the main concern again is on relevance.

Accordingly, a need arises for techniques that provide improved information retrieval.

SUMMARY

Embodiments of the present systems and methods may provide techniques that provide improved information retrieval. Embodiments may utilize a fusion-based retrieval approach that utilizes passage-level information for enhanced retrieval quality. Embodiments may utilize a probabilistic fusion framework as well as document-level and list-level processing. Both embodiments may result in improved information retrieval.

For example, in an embodiment, a method may be implemented in a computer system comprising a processor, memory accessible by the processor, and computer program instructions stored in the memory and executable by the processor, the method may comprise receiving, at the computer system, a query to retrieve a document from a corpus of documents, retrieving, at the computer system, a plurality of documents from the corpus of documents using a plurality of retrieval methods, each retrieval method generating a ranked list of retrieved documents and a score for each document, fusing, at the computer system, the generated ranked list of retrieved documents to form an aggregated ranked list of retrieved documents by re-scoring, at the computer system, the plurality of documents according to its passage scores, with respect to the query and associating, at the computer system, a given document and its maximal passage using relevance information induced from the plurality of ranked lists.

In embodiments, fusing further may comprise utilizing, at the computer system, passages contained within each ranked list for estimating a relevance dependent association between pseudo-effective ranked lists, the performance of which is assumed to be effective, and each of the plurality of documents. The retrieving may be performed using at least one of CombSUM, CombMNZ, Borda, or RRF. The fusing may be performed using at least one of MaxPsg, CombMaxPsg, or PsgPFF. MaxPsg may re-score each document based on a score of the passage with the highest retrieval score. CombMaxPsg may re-score each document based on a score of the passage with the highest retrieval score combined with a relevance of each passage. PsgPFF may re-score each document based on relevance of passages within each ranked list having the highest retrieval score.

In an embodiment, a system may comprise a processor, memory accessible by the processor, and computer program instructions stored in the memory and executable by the processor to perform receiving a query to retrieve a document from a corpus of documents, retrieving a plurality of documents from the corpus of documents using a plurality of retrieval methods, each retrieval method generating a ranked list of retrieved documents and a score for each document, fusing the generated ranked list of retrieved documents to form an aggregated ranked list of retrieved documents by re-scoring the plurality of documents according to its passage scores, with respect to the query and associating a given document and its maximal passage using relevance information induced from the plurality of ranked lists.

In an embodiment, a computer program product may comprise a non-transitory computer readable storage having program instructions embodied therewith, the program instructions executable by a computer, to cause the computer to perform a method comprising receiving, at the computer system, a query to retrieve a document from a corpus of documents, retrieving, at the computer system, a plurality of documents from the corpus of documents using a plurality of retrieval methods, each retrieval method generating a ranked list of retrieved documents and a score for each document, fusing, at the computer system, the generated ranked list of retrieved documents to form an aggregated ranked list of retrieved documents by re-scoring, at the computer system, the plurality of documents according to its passage scores, with respect to the query and associating, at the computer system, a given document and its maximal passage using relevance information induced from the plurality of ranked lists . . . .

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques that provide improved information retrieval. Embodiments may utilize a fusion-based retrieval approach that utilizes passage-level information for enhanced retrieval quality. Embodiments may utilize a probabilistic fusion framework as well as document-level and list-level processing. Both embodiments may result in improved information retrieval.

Figure 1:
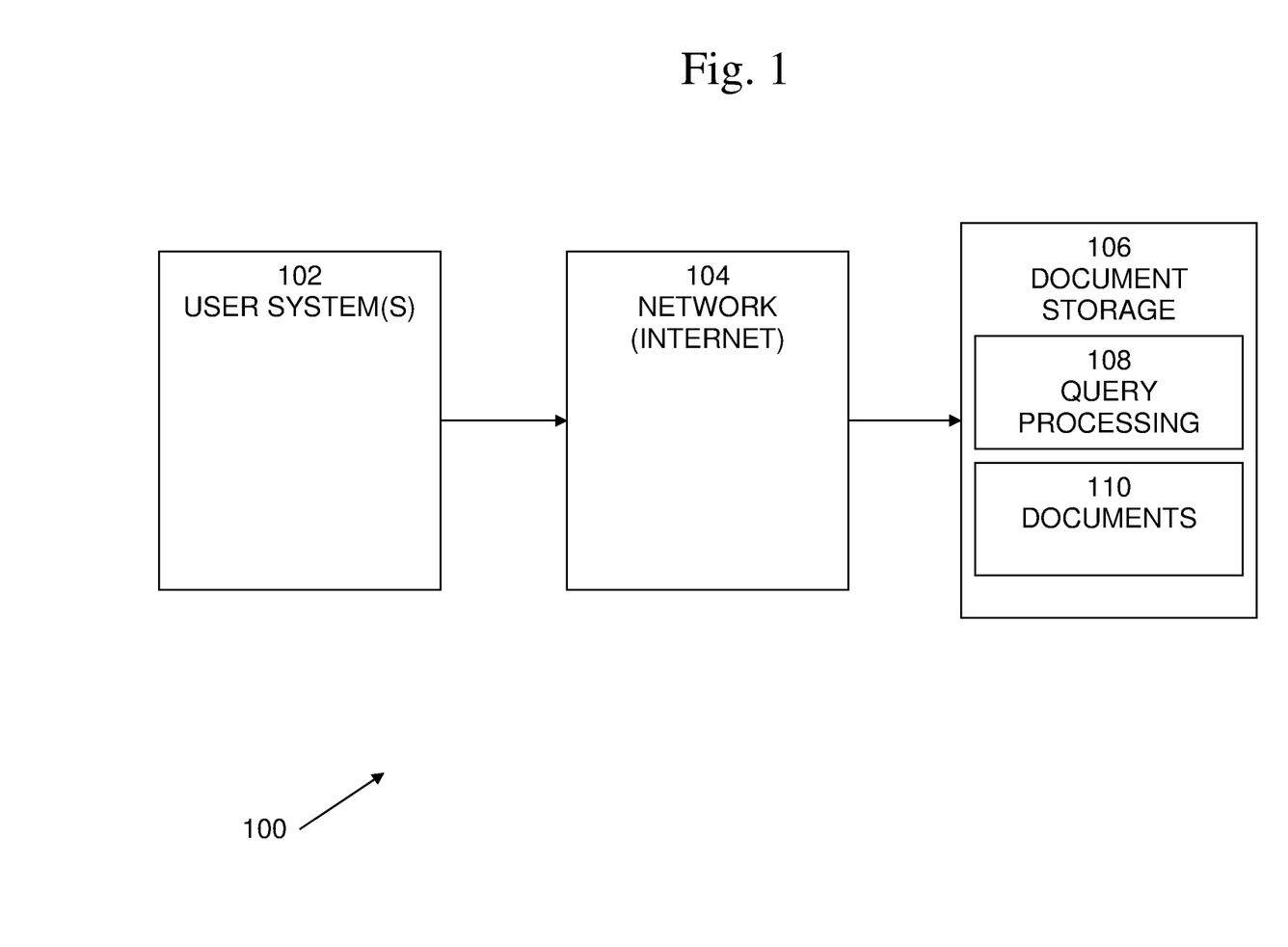
FIG. 1 is an exemplary block diagram of document retrieval system according to embodiments of the present systems and methods.

An exemplary block diagram of a document retrieval system 100 is shown in FIG. 1. System 100 may include one or more user systems 102, network 104, and document storage system 106. User systems 102 may include computer system and computing devices that may be operated by users to retrieve documents using queries and query criteria. User systems 102 may include devices such as personal computers, workstations, server computer systems, laptop computer systems, smartphones, tablet computers, etc. Network 104 may include any number and any type of public and private networks, such as the Internet, wide-area networks, local-area networks, wireline, and wireless networks, etc. Document storage system 106 may include query processing 108 and documents 110. Query processing may receive queries or query-related information originating at one or more user systems 102 and may retrieve documents responsive to each query from documents 110.

Figure 2:
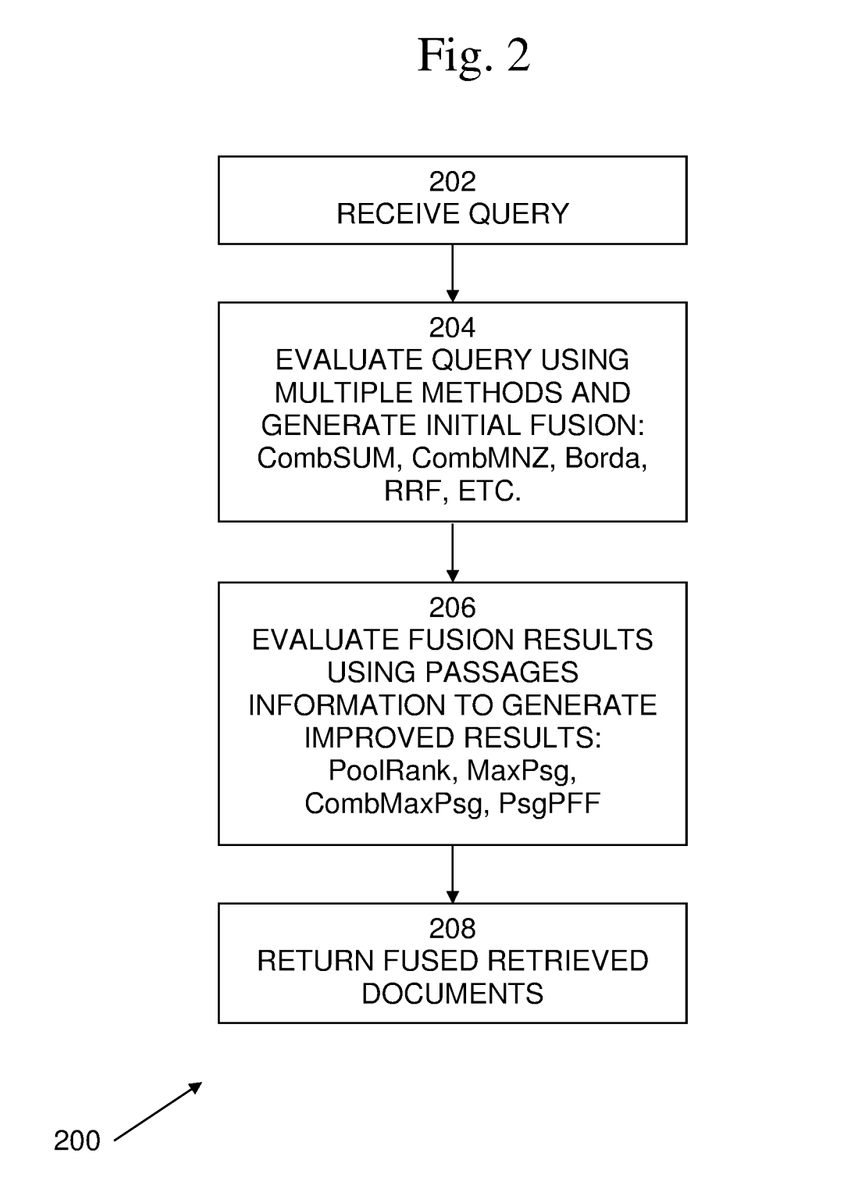
FIG. 2 is an exemplary flow diagram of document retrieval process, according to embodiments of the present systems and methods.

An exemplary flow diagram of a document retrieval process 200, which may be performed using the system shown in FIG. 1, is shown in FIG. 2. Documents may be retrieved from corpus of documents 110 utilizing passage-level information for document retrieval based on refined relevancy score of documents. It is best viewed in conjunction with FIG. 1. Process 200 begins with 202, in which one or more queries may be received from user systems 102. At 204, each query may be evaluated over a corpus of documents 110 using a plurality of different retrieval methods. Each retrieval method may retrieve different sets of documents, which may be fused to generate initial fusion lists. At 206, the plurality of sets of documents retrieved by the plurality of different retrieval methods may be fused to form an aggregated set of retrieved documents using passage based information. For example, each document may be re-scored according to its highest scored passage (refined relevance score), with respect to the query. Documents and their maximal passages may be associated using relevance information induced from the various lists. Passages contained within each list may be used for estimating the relevance dependent association between pseudo-effective lists (i.e., performance of lists is assumed to be effective) and any given candidate document. At 208, a fused set of retrieved documents may be returned. Process 200 is described in greater detail below.

Fusion-based document retrieval 204: To start, the fusion-based document retrieval task may be formally defined. Let q denote a query and let C denote a corpus of documents. In a fusion-based retrieval setting, query q may be evaluated over corpus C using several different retrieval methods, which may be different and independent of each other. Let $\mathcal{L} = \{L_1, L_2, \ldots, L_m\}$ denote a set of m (>1) ranked lists, or "runs", where each ranked list $L_i (\in \mathcal{L})$ contains the top-k documents d (E C) with the highest retrieval scores $S_{L_i}(d;q)$ according to the i-th retrieval method (i∈{1, 2 ..., m}). Let $$\mathcal{D}_\mathcal{L} \stackrel{def}{=} \bigcup_{i=1}^{m} L_i$$

further denote the pool of documents available for fusion.

The fusion-based document retrieval task may utilize information available in $\mathcal{L}$ so as to derive an (aggregated) positive score F(d;q) for each document $d \in \mathcal{D}_\mathcal{L}$; and F(d;q) ≜ 0, otherwise. The fusion outcome may therefore be a fused-list $L_F$ of the top-k documents in $\mathcal{D}_\mathcal{L}$ with the highest fusion score F(•;q).

Basic fusion methods: Embodiments may use any fusion methods, for example, four common (and basic) fusion methods which may be used to derive an initial fusion score F(•;q) for documents in $\mathcal{D}_\mathcal{L}$. All four exemplary methods derive F(•;q) using document scores (or ranks) as observed within the various lists in $\mathcal{L}$. The core principle behind such methods is that, the higher (lower) the score (rank) of a document $d \in \mathcal{D}_\mathcal{L}$ is within more lists, the more "relevant" it is assumed to be.

The first two exemplary methods are CombSUM and CombMNZ, which calculate F(•;q) using document scores. As a preliminary step, the document scores of each list $L_i(\in \mathcal{L})$ may be normalized using, for example, sum/0-1 (max-min) normalization in the case of CombSUM/CombMNZ. Let $\overline{S}_{L_i}(d;q)$ denote the normalized score of document $d \in \mathcal{L}_i$ (whenever $d \notin \mathcal{L}_i$, then $\overline{S}_{L_i}(d;q)$=0. The CombSUM score of a given document d ($\in \mathcal{D}_\mathcal{L}$) may be calculated as:

$$F_{CombSUM}(d;q) \stackrel{def}{=} \sum_{i=1}^{m} \overline{S}_{L_i}(d;q).$$

The CombMNZ score of a given document may be calculated as:

$$F_{combMNZ}(d;q) = NZ(d) \cdot F_{combMNZ}(d;q),$$

where NZ(d) is the number of lists in $\mathcal{L}$ that include document d.

The two other exemplary methods are Borda and RRF. Both methods operate similarly to the CombSUM method, yet they utilize document ranks rather than scores, as follows. Let $rank_{L_i}(d;q)$ denote the rank of document $d \in \mathcal{L}_i$. If $d \notin \mathcal{L}_i$ then it may be assumed that $rank_{L_i}(d;q)=|L_i|$. The Borda score of a given document is defined as the number of documents not ranked higher than it in the lists; formally:

$$F_{Borda}(d;q) \stackrel{def}{=} \sum_{i=1}^{m} \min(k, |L_i|) - rank_{L_i}(d;q).$$

The RRF score of a given document may be calculated according to its reciprocal ranks, as follows:

$$F_{RRF}(d;q) \stackrel{def}{=} \sum_{i=1}^{m} \frac{1}{rank_{L_i}(d;q) + 60}.$$

Language modeling: Embodiments may utilize language models. For example, language models and basic notations may include:

For a given word w, let c(w,x) denote an occurrence count of the word in a given text x. Let $|x| \triangleq \Sigma_{w \in x} c(w,x)$ denote the length of text x. Let $$\hat{p}_x^{[\mu]}(w) \stackrel{def}{=} \frac{c(w,x) + \mu \frac{c(w,C)}{|C|}}{|x| + \mu}$$

denote a Dirichlet-smoothed language model. In embodiments, $\mu=1000$ may be used for smoothed language models.

For a given query q and set of texts X, let $P_{R_{[x]}}(w)$ denote a relevance model induced from X. Embodiments may use the RM1 relevance model and simply estimate:

$$\hat{p}_{R_{[x]}}(w) \stackrel{def}{=} \sum_{x \in X} \hat{p}_x^{[0]}(w) \frac{\hat{p}_x^{[\mu]}(q)}{\sum_{x' \in X} \hat{p}_{x'}^{[\mu]}(q)},$$

where $$\hat{p}_x^{[\mu]}(q) \stackrel{def}{=} \prod_{w \in q} \hat{p}_x^{[\mu]}(w)^{c(w,x)}$$

is the is the query likelihood according to text x (language model). Finally, given a pair of texts x,y, the textual similarity may be calculated using the KL divergence:

$$sim(x, y) \stackrel{def}{=} \exp(-KL(\hat{p}_x^{[0]}(\cdot) \| \hat{p}_y^{[\mu]}(\cdot))).$$

Utilizing Passages for Fusion 206. Embodiments may use alternative methods that incorporate passage-level information during document fusion. For example, each method may basically estimate a refined relevance score for documents in $\mathcal{D}_\mathcal{L}$. On each such method, using, for example, a PoolRank approach, the documents maybe re-ranked in $\mathcal{D}_\mathcal{L}$ according to their refined relevance score. In an embodiment, a first method, termed MaxPsg, may be motivated by previous works that utilized passage-level information for document retrieval. Within this method, each document $d \in \mathcal{D}_\mathcal{L}$ may be rescored according to its highest scored (contained) passage g (with respect to q).

In an embodiment, a second method, termed Comb-MaxPsg, is an extension of MaxPsg, which further considers the relevance-dependent association between a given document and its maximal passage using relevance information induced from the various lists in $\mathcal{L}$. In an embodiment, a third method, termed PsgPFF, builds on top of a probabilistic fusion framework (PFF). Within this method, passages contained within each list may be utilized for estimating the relevance-dependent association between pseudo-effective lists, such as lists whose performance is assumed to be effective, and any given document $d \in \mathcal{D}_\mathcal{L}$.

MaxPsg. Embodiments may utilize, a simple, yet still effective, way in which more focused information can be leveraged in a fusion setting. In this embodiment, a first method, MaxPsg, may re-score each document $d \in \mathcal{D}_\mathcal{L}$ according to the score of the passage $g \in d$ with the highest retrieval score, for example:

$$F_{MaxPsg}(d; q) \stackrel{def}{=} \max_{g \in d} S_{\mathcal{P}}(d; q), \quad (1)$$

where $\mathcal{P}$ denotes some passage scoring method used to score passages, such as TF-IDF, BM25, Query-likelihood, etc.

CombMaxPsg. In embodiments, MaxPsg may be extended to leverage relevance information induced from the various lists in $\mathcal{L}$ in order to improve selection of the best passage to be utilized for document scoring. To this end, let R denote the event of relevance and let $\hat{p}(d|q,R)$ denote the estimation of the likelihood that a given document $d \in \mathcal{D}_\mathcal{L}$ is relevant to a given query q. Utilizing the document's passages, this likelihood may be derived as follows:

$$\hat{p}(d|q, R) = \sum_{g \in d} \hat{p}(d|g, R)\hat{p}(g|q, R). \quad (2)$$

Here, $\hat{p}(g|q,R)$ denotes the likelihood that passage $g \in d$ is relevant to q. Assuming that passage g is relevant, $\hat{p}(d|g,R)$ further models its association with its containing document d, whose relevance may be characterized. Motivated by the MaxPsg approach, as an intermediate step towards the derivation of a second passage-based fusion (scoring) method, the following estimate may be obtained:

$$\hat{p}_{MaxPsg}(d|q, R) \stackrel{def}{=} \max_{g \in d} \hat{p}(d|g, R)\hat{p}(g|q, R). \quad (3)$$

To estimate $\hat{p}(d|g,R)$, relevance information induced from the various lists in $\mathcal{L}$ may be utilized, as follows:

$$\hat{p}(d|g, R) \stackrel{def}{=} \sum_{L_i \in \mathcal{L}} \hat{p}(d|L_i, R)\hat{p}(g|q, R). \quad (4)$$

Here, the association between a (presumably relevant) passage $g \in d$ and its containing document may be (indirectly) estimated by a two-step process. First, the term $\hat{p}(d|L_i,R)$ characterizes the association of such a passage with a given reference list $L_i (\in \mathcal{L})$. Assuming that such list is effective, for example, contains some relevant information to q, then next, that list's association with the document d itself may be characterized. Using such a two-step process allows to "validate" the association between document d and any of its contained (presumably relevant) passages. The more evidence that may be gained from the various lists, the stronger such an association may be assumed to be.

Next, it may be noted that $$\hat{p}(L_i|g, R) = \frac{\hat{p}(L_i, R|g)}{\hat{p}(R|g)} \text{ and } \hat{p}(d|L_i, R) \approx \frac{\hat{p}(L_i, R|d)}{\hat{p}(R|L_i)}$$

(assuming that the priors of both lists in $\mathcal{L}$ and documents in $\mathcal{D}_\mathcal{L}$ are uniformly distributed). Putting these two facts back into Eq. 4 and further putting the outcome back into Eq. 3, while further noting that $\hat{p}(g|q,R) \propto \hat{p}(q|g,R)\hat{p}(R|g)$, yields a second fusion method:

$$F_{CombMaxPsg}(d; q) \stackrel{def}{=} \max_{g \in d} \hat{p}(q|g, R) \sum_{L_i \in \mathcal{L}} \frac{\hat{p}(L_i, R|d)\hat{p}(L_i, R|g)}{\hat{p}(R|L_i)}. \quad (5)$$

Next, estimation of the various likelihood terms is described. First, for a given passage scoring method $\mathcal{P}$, $\hat{p}(q|g,R)$, may be estimated in the context of d using a normalized score such as $$\hat{p}(q\mid g, R) \stackrel{def}{=} \frac{S_\mathcal{P}(g; q)}{\sum_{g'\in d} S_\mathcal{P}(g'; q)}.$$

Next, for a given text $x\in\{g,d\}$, either a passage or a document, $\hat{p}(L_i,R|x)$ may be estimated according to the information gained by "encoding" the relevance model induced from list $L_i$ ($\in \mathcal{L}$) using the (smoothed) language-model of text x compared to that of the (unsmoothed) language-model of the background corpus C. Formally:

$$\hat{p}(L_i, R\mid x) \stackrel{def}{=} \sum_w \hat{p}(w\mid R_{[L_i]}) \log \frac{\hat{p}^{[\mu]}(w\mid x)}{\hat{p}^{[0]}(w\mid C)}. \quad (6)$$

Finally the term $\hat{p}(R|L_i)$ may be estimated as the entropy of $L_i$'s centroid (unsmoothed) language-model according to:

$$\hat{p}(R\mid L_i) \stackrel{def}{=} \sum_w \hat{p}^{[0]}(w\mid L_i) \log \hat{p}^{[0]}(w\mid L_i). \quad (7)$$

The centroid of a given list may be obtained by simply concatenating the text of its documents.

PsgPFF. In embodiments, a third method may utilize a probabilistic fusion framework (PFF). According to this framework, the relevance likelihood $\hat{p}(d|q,R)$ of each document $d \in \mathcal{D}_\mathcal{L}$ may be estimated as follows:

$$\hat{p}_{FFF}(d\mid q, R) \stackrel{def}{=} \sum_{L_i\in\mathcal{L}} \hat{p}(d\mid L_i, R)\hat{p}(L_i\mid q, R). \quad (8)$$

Here, the term $\hat{p}(L_i|q,R)$ estimates the retrieval quality of a given list $L_i(\in\mathcal{L})$. Such an estimation is the core task of post-retrieval query performance prediction (QPP) methods, where any such method may be applied, including those that utilize passages.

Similar to the previous method, the term $\hat{p}(d|L_i,R)$ further measures the association of document d ($\in \mathcal{D}_\mathcal{L}$) with list $L_i(\in\mathcal{L})$, assuming the latter is an effective list. Previously, such an association was estimated based on document or document-list level characteristics, such as the document's score $S_{L_i}(d;q)$ or rank $\text{rank}_{L_i}(d;q)$. We now suggest an alternative estimation of this term using passage level information induced from a given list $L_i(\in\mathcal{L})$. To this end, utilizing passages that are contained within a given list $L_i$'s documents, this term may be estimated as follows:

$$\hat{p}(d\mid L_i, R) \stackrel{def}{=} \sum_{g\in\mathcal{L}} \hat{p}(d\mid g, R)\hat{p}(g\mid L_i, R). \quad (9)$$

Motivated again by the MaxPsg approach, this term may be estimated using a single ("best") passage as well. Yet, compared to Eq. 2, Eq. 9 is not limited to q, making such an estimation much harder. To overcome this limitation, this estimation may be we heuristically "anchored" to query q, as follows:

$$\hat{p}(d|L_i,R) \approx S_\mathcal{P}(g_i^*;q)\hat{p}(d|g_i^*,R)\hat{p}(g_i^*|L_i,R), \quad (10)$$

where $$g_i^* \stackrel{def}{=} \operatorname*{argmax}_{g\in L_i} S_\mathcal{P}(g; q),$$

for a given passage scoring method $\mathcal{P}$.

Putting back Eq. 10 into Eq. 8 then yields a third fusion method:

$$F_{PsgPFF}(d; q) \stackrel{def}{=} \sum_{L_i\in\mathcal{L}} S_\mathcal{P}(g_i^*; q)\hat{p}(d\mid g_i^*, R)\hat{p}(g_i^*\mid L_i, R)\hat{p}(L_i\mid R). \quad (11)$$

To estimate $\hat{p}(g_i^*|L_i,R)$, it may be noted that, for any passage g the following holds:

$$\hat{p}(g_i^* \mid L_i, R) = \frac{\hat{p}(L_i, R\mid g)}{\hat{p}(R\mid g)}.$$

Using this fact, $\hat{p}(L_i,R|g)$ may be estimated according to Eq. 6. The term $\hat{p}(R|g)$ further denotes the general relevance of passage g (independently of a specific query). For a given list $L_i(\in\mathcal{L})$, this term may be estimated as a (normalized) combination of two sub-terms as $$\hat{p}(R\mid g) \stackrel{def}{=} \frac{H(g)\cdot posBias(g)}{\sum_{g'\in L_i} H(g')\cdot posBias(g')}. \quad (12)$$

follows:

The entropy of passage g's unsmoothed language model may be defined as:

$$H(g) \stackrel{def}{=} -\sum_{w\in g} \hat{p}_g^{[0]}(w)\log \hat{p}_g^{[0]}(w),$$

indicating a preference for more diverse passages. Then $$posBias(g) \stackrel{def}{=} 1 + \frac{1}{\log(2+g\cdot s)},$$

where g·s denotes the start position (in character offsets) of passage g within its containing document. Hence, posBias (g) prefers passages that are located as early as possible within their containing documents.

Finally, for a given passage g, the term $\hat{p}(d|g,R)$ may be estimated according to the information gained by encoding its (unsmoothed) language model using document d's (smoothed) language model, compared to encoding it with the background (corpus) language model, according to:

$$\hat{p}(d\mid g, R) \stackrel{def}{=} \sum_{w\in g} \hat{p}_g^{[0]}(w) \log \frac{\hat{p}_d^{[\mu]}(w)}{\hat{p}_C^{[0]}(w)}. \quad (13)$$

Utilizing basic document fusion scores. Embodiments of passage-level scoring methods discussed so far have ignored the original scores assigned to each document d∈$\mathcal{D_L}$ within the various lists in $\mathcal{L}$ in which they may have appeared. To overcome this limitation, in embodiments, for each document d∈$\mathcal{D_L}$ its basic fusion score F(d;q), such as CombSUM, CombMNZ, etc., may be interpolated with the score derived by any of the embodiments of passage-based fusion methods. To this end, let λ∈[0, 1], then the two scores of a given document d∈$\mathcal{D_L}$ may be combined using a logarithmic-interpolation:

$$F'_M(d;q) \stackrel{\text{def}}{=} F(d;q)^\lambda F_M(d;q)^{1-\lambda} \quad (14)$$

with M∈{MaxPsg,CombMaxPsg,PsgPFF}.

EVALUATION. Datasets and setup. Table 1 summarizes the TREC datasets used in the evaluation, which include the ad-hoc track of TREC3, the Web tracks of TREC9 and TREC10, and the robust track (which utilizes all 250 Robust04 topics) of TREC13.

TABLE 1

| Track dataset | topics | # documents | # runs | P@20 |
|---|---|---|---|---|
| TREC3 ad-hoc | 151-200 | 741,856 | 40 | .009-.633 |
| TREC9 Web | 451-500 | 1,692,096 | 103 | .009-.373 |
| TREC10 Web | 501-550 | 1,692,096 | 97 | .040-.433 |
| TREC13 Robust | 301-450, 601-700 | 528,155 | 105 | .089-.428 |

Fusion performance was assessed using two primary modes of evaluation, namely random and best. In the random mode, on each track, 20 subsets of m=5 runs (rankers) each were randomly sampled; each sampled run included at least 20 documents per each query. In this mode, the report includes the average retrieval quality obtained across the 20 (subset) samples. In the best mode, on each track, the runs of the top-5 best performing systems were used. To this end, systems were ranked according to P@20. Unless specified otherwise, in both evaluation modes, CombMNZ was employed as the underlying basic fusion method of choice. Moreover, the different runs (ranked lists) were combined together using the various evaluated fusion methods.

Fusion-based retrieval performance was evaluated based on the top-20 documents in a given (final) fused-list. Retrieval quality was measured (using TREC's relevance judgments) according to mean average precision (MAP) and NDCG@k (N@k, with k∈{5, 10, 20}). Statistically significant differences in quality were found using the two-tailed paired t-test computed at a 95% confidence level.

Passage-based fusion methods. The instantiation of embodiments of passage-based fusion methods, such as MaxPsg, CombMaxPsg and PsgPFF, etc., requires the extraction of passages from documents in $\mathcal{D_L}$ and scoring of the documents according to some method $S_\mathcal{P}$ (•;q). Unless specified otherwise, passages were extracted from documents using a 500 character-windowing (without overlap) approach and the documents were scored according to query likelihood. Again, unless specified otherwise, interpolation (see Eq. 14) was applied with λ=0.5, assigning an equal importance. Finally, to instantiate PsgPFF, as the default choice of QPP method that estimates $\hat{p}(L_i|q,R)$ ($L_i \in \mathcal{L}$), we consider the Passage-Information (PI) method, which may be implemented as follows:

$$\hat{p}_{PI}(L_i|q,R) \stackrel{\text{def}}{=} \frac{1}{k\sqrt{|q|}} \sum_{d \in L_i} S_{L_i}(d;q) \cdot \left( \max_{g \in d} S_\mathcal{P}(g;q) sim(g,d) \hat{p}(R|g) \right).$$

Baselines. As a first line baseline, the four (scorebased and rank-based) basic fusion methods, described above, were compared against. As a second line of baselines, three state-of-the-art content-based fusion methods were compared against. Each baseline was instantiated with a given basic fusion method F and used to score all documents in $\mathcal{D_L}$, as follows:

ClustFuse: this method first clusters documents in $\mathcal{D_L}$ and obtains clusters Cl($\mathcal{D_L}$). A document d may then be scored: $F_{ClustFuse}(d;q) \stackrel{\text{def}}{=} (1-\lambda)F'(d;q) + \lambda \Sigma_{c \in Cl} \hat{p}(d|c)\hat{p}(c|q)$, with λ∈{0, 0.1, . . . , 1}. Here F'(d;q) denotes the (sum) normalized basic fusion score of document d (over $\mathcal{D_L}$). $\hat{p}(c|q) \stackrel{\text{def}}{=} \Pi_{d \in c} F(d;q)$, further normalized over clusters in Cl($\mathcal{D_L}$). $\hat{p}(d|c) \stackrel{\text{def}}{=} \Sigma_{d' \in c} sim(d,d')$, further normalized over $\mathcal{D_L}$. Following, a KNN-clustering approach was applied, where each document d∈$\mathcal{D_L}$ and its δ∈{2, 3, 5, 7, 9} nearest neighbors (according to sim(•)) formed a cluster.

Manifold: this method uses manifold-based learning (regularized with the basic fusion scores F(q)≝F(•;q)). The Manifold fusion score may be obtained as follows (in a vector form):

$$\mathbb{F}_{Manifold}(q) \stackrel{\text{def}}{=} (1-a)(1-aS)^{-1}F(q),$$

where I is an identity matrix, $S=D^{-1/2}WD^{-1/2}$ and $$\alpha = \frac{1}{1+\beta}.$$

Here W is a similarity matrix (with $W_{ij} \stackrel{\text{def}}{=} sim(d_i,d_j)$), D is a diagonal matrix (with $D_{ij}=\Sigma_j W_{ij}$), and β∈{0, 0.1, 0.2, . . . , 1} is the regularization parameter.

TSPoolRank: this method performs a two-step retrieval. In the first step, documents in $\mathcal{D_L}$ are scored according to a PFF fusion score (see Eq. 8), where $$\hat{p}(d|L_i,R) \stackrel{\text{def}}{=} \frac{\hat{p}(L_i,R|d)}{\hat{p}(R|L_i)}.$$

The top-1 (∈{5, 10, 20}) scored documents in $\mathcal{D_L}$ may then be used to derive a pseudo-relevance feedback (PRF) model. Using a PoolRank approach, in the second step, documents in $\mathcal{D_L}$ may be re-ranked using the induced PRF model. Such a re-ranking is equivalent to a log-interpolation approach with λ=0.5 (see Eq. 14); but, using the PFF score instead of the Basic fusion score. WIG was used to estimate $\hat{p}(L_i,R|d)$ (see again Eq. 8).

Figure 3:
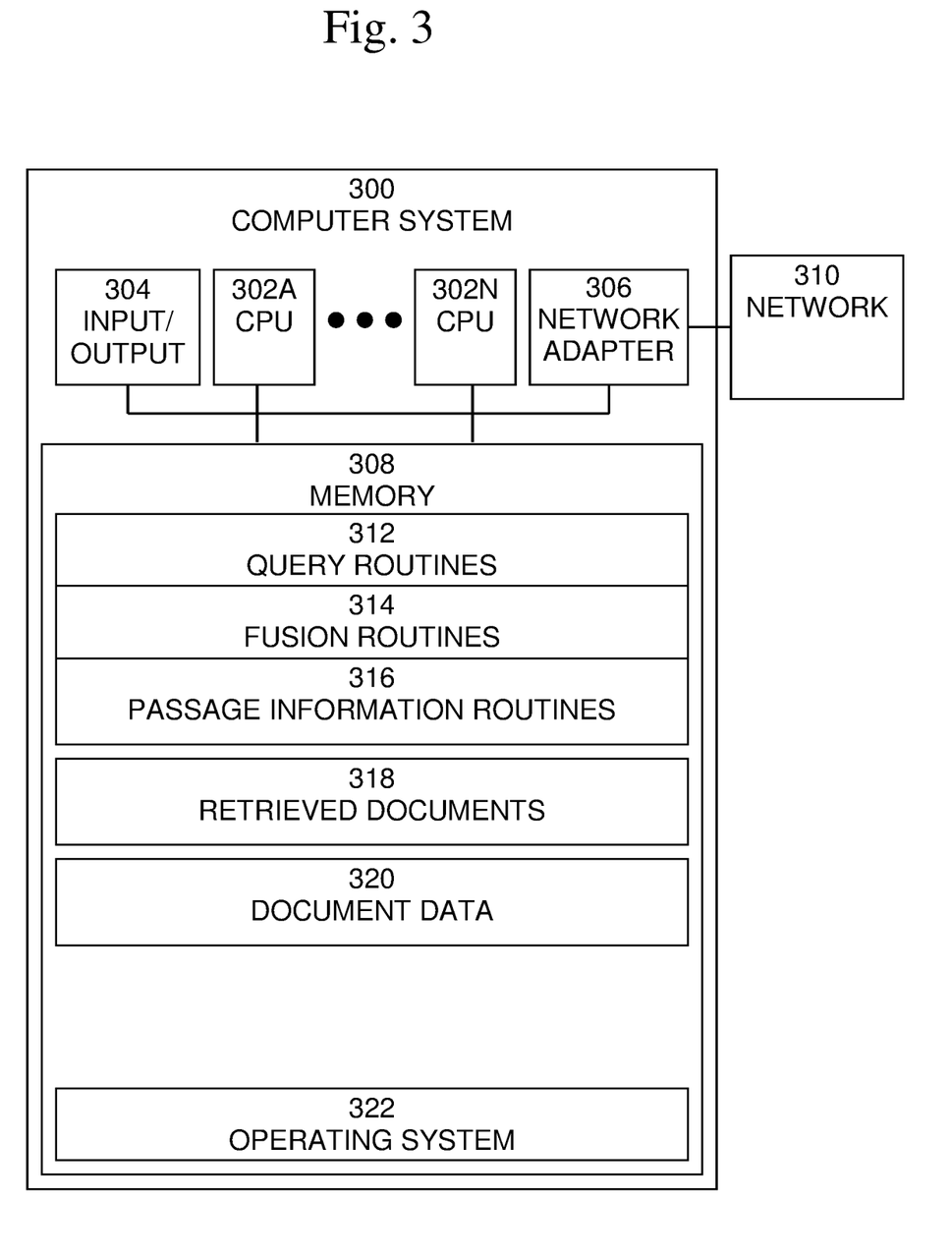
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include query routines 312, fusion routines 314, passage information routines 316, retrieved documents 318, document data 320, and operating system 322. Query routines 312 may include software routines to receive and process queries according to embodiments of the present systems and methods, as described above. Fusion routines 314 may include software routines to evaluate queries over a corpus of documents 320 and to generate initial fusion lists according to embodiments of the present systems and methods, as described above. Passage information routines 316 may include software routines to fuse retrieved document lists to form an aggregated set of retrieved documents 318 using passage based information according to embodiments of the present systems and methods, as described above. Operating system routines 322 may provide additional system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, and computer program instructions stored in the memory and executable by the processor, the method comprising:
   receiving, at the computer system, a query to retrieve a document from a corpus of documents;
   retrieving, at the computer system, a plurality of documents from the corpus of documents using a plurality of retrieval methods, each retrieval method generating a ranked list of retrieved documents and a score for each document;
   fusing, at the computer system, the generated ranked list of retrieved documents to form an aggregated ranked list of retrieved documents by:
      re-scoring, at the computer system, the plurality of documents according to its passage scores, with respect to the query, using at least one of Comb-MaxPsg, or PsgPFF, wherein MaxPsg re-scores each document based on a score of the passage with the highest retrieval score, and wherein CombMaxPsg re-scores each document based on a score of the passage with the highest retrieval score combined with a relevance of each passage; and
      associating, at the computer system, a given document and its highest scored passage using information indicating a relevance of the passage induced from the plurality of ranked lists.

2. The method of claim 1, wherein fusing further comprises utilizing, at the computer system, passages contained within each ranked list for estimating a relevance dependent association between pseudo-effective ranked lists, wherein a pseudo-effective ranked list is a ranked list the performance of which is assumed to be effective, and each of the plurality of documents.

3. The method of claim 2, wherein the retrieving comprises generating an initial fusion score for the retrieved documents using at least one of CombSUM, CombMNZ, Borda, or RRF.

4. The method of claim 3, wherein the fusing is performed using MaxPsg.

5. The method of claim 4, wherein MaxPsg re-scores each document based on a score of the passage with the highest retrieval score.

6. A system comprising a processor, memory accessible by the processor, and computer program instructions stored in the memory and executable by the processor to perform:
  receiving a query to retrieve a document from a corpus of documents;
  retrieving a plurality of documents from the corpus of documents using a plurality of retrieval methods, each retrieval method generating a ranked list of retrieved documents and a score for each document;
  fusing the generated ranked list of retrieved documents to form an aggregated ranked list of retrieved documents by:
    re-scoring the plurality of documents according to its passage scores, with respect to the query, using at least one of CombMaxPsg, or PsgPFF, wherein MaxPsg re-scores each document based on a score of the passage with the highest retrieval score, and wherein CombMaxPsg re-scores each document based on a score of the passage with the highest retrieval score combined with a relevance of each passage; and
    associating a given document and its highest scored passage using information indicating a relevance of the passage induced from the plurality of ranked lists.

7. The system of claim 6, wherein fusing further comprises utilizing passages contained within each ranked list for estimating a relevance dependent association between pseudo-effective ranked lists, wherein a pseudo-effective ranked list is a ranked list the performance of which is assumed to be effective, and each of the plurality of documents.

8. The system of claim 7, wherein the retrieving comprises generating an initial fusion score for the retrieved documents using at least one of CombSUM, CombMNZ, Borda, or RRF.

9. The system of claim 8, wherein the fusing is performed using MaxPsg.

10. The system of claim 9, wherein MaxPsg re-scores each document based on a score of the passage with the highest retrieval score.

11. A computer program product comprising a non-transitory computer readable storage having program instructions embodied therewith, the program instructions executable by a computer, to cause the computer to perform a method comprising:
  receiving, at the computer system, a query to retrieve a document from a corpus of documents;
  retrieving, at the computer system, a plurality of documents from the corpus of documents using a plurality of retrieval methods, each retrieval method generating a ranked list of retrieved documents and a score for each document;
  fusing, at the computer system, the generated ranked list of retrieved documents to form an aggregated ranked list of retrieved documents by:
    re-scoring, at the computer system, the plurality of documents according to its passage scores, with respect to the query, using at least one of CombMaxPsg, or PsgPFF, wherein MaxPsg re-scores each document based on a score of the passage with the highest retrieval score, and wherein CombMaxPsg re-scores each document based on a score of the passage with the highest retrieval score combined with a relevance of each passage; and
    associating, at the computer system, a given document and its highest scored passage using information indicating a relevance of the passage induced from the plurality of ranked lists.

12. The method of claim 11, wherein fusing further comprises utilizing, at the computer system, passages contained within each ranked list for estimating a relevance dependent association between pseudo-effective ranked lists, wherein a pseudo-effective ranked list is a ranked list the performance of which is assumed to be effective, and each of the plurality of documents.

13. The method of claim 12, wherein the retrieving comprises generating an initial fusion score for the retrieved documents using at least one of CombSUM, CombMNZ, Borda, or RRF.

14. The method of claim 13, wherein the fusing is performed using MaxPsg.

15. The method of claim 14, wherein MaxPsg re-scores each document based on a score of the passage with the highest retrieval score.

* * * * *